United States Patent [19]
Krüger

[11] Patent Number: 5,619,989
[45] Date of Patent: Apr. 15, 1997

[54] RESPIRATOR FILTER

[75] Inventor: Jens Krüger, Lübeck, Germany

[73] Assignee: Drägerwerk AG, Lübeck, Germany

[21] Appl. No.: 399,856

[22] Filed: Mar. 7, 1995

[30] Foreign Application Priority Data

Mar. 26, 1994 [DE] Germany .......................... 44 10 582.7

[51] Int. Cl.$^6$ ..................................................... A62B 7/00
[52] U.S. Cl. ................... 128/206.17; 128/205.27; 128/205.29; 55/501; 55/475
[58] Field of Search .......... 128/205.27, 205.28, 128/205.29, 206.18, 206.17; 55/521, 497, 499, 501, 475

[56] References Cited

U.S. PATENT DOCUMENTS

| | | | |
|---|---|---|---|
| 3,417,551 | 12/1968 | Bonell | 55/499 |
| 3,803,817 | 4/1974 | Lewis | 128/205.29 |
| 4,543,112 | 9/1985 | Ackley et al. | 128/205.27 |
| 4,714,486 | 12/1987 | Silverthron | 128/205.28 |
| 5,038,775 | 8/1991 | Maruscak et al. | 128/205.27 |

FOREIGN PATENT DOCUMENTS

| | | |
|---|---|---|
| 438556 | 11/1935 | France . |
| 655223 | 12/1937 | Germany . |
| 702119 | 1/1941 | Germany . |
| 1123918 | 8/1962 | Germany . |

Primary Examiner—V. Millin
Assistant Examiner—William J. Deane, Jr.
Attorney, Agent, or Firm—McGlew & Tuttle

[57] ABSTRACT

A respirator filter with a pot-shaped filter housing, with a flange at the edge of the filter housing, with a flow channel passing through the filter housing with a sealing surface, with a housing cover and with a filter element located in the filter housing is to be optimized in terms of simpler manufacture. To accomplish this task, with the housing cover located at a spaced location from and in parallel to the filter housing, a distance a between the sealing surface and the corresponding part of the housing cover, on the one hand, and a distance (b) between the flange and an outer edge of the housing cover, on the other hand, are dimensioned such that distance (a) is smaller than distance (b), so that when the housing cover is being placed on the filter housing, it comes into contact first with the sealing surface and then with the flange, while the housing cover warps.

6 Claims, 2 Drawing Sheets

RESPIRATOR FILTER

U.S. GOVERNMENT INTEREST

This invention was made with government support under F33657-92-C-2120 awarded by the Department of the U.S. Air Force. The United States Government has certain rights in this invention.

FIELD OF THE INVENTION

The present invention pertains to a respirator filter with a pot-shaped filter housing and a flange at the edge of the filter housing, with a flow channel passing through the filter housing with a sealing surface, with a filter element lying on a flange and on the sealing surface, with a flexible housing cover which closes the filter housing, presses the filter element against the flange and the sealing surface, and with an air distribution chamber formed by a spacer section between the filter element and the housing cover.

BACKGROUND OF THE INVENTION

A respirator filter of this type has become known from German Patent No. DE-PS 11,23,918. The prior-art respirator filter has a pot-shaped filter housing with a flange acting as a contact surface for a filter element, which is pressed against the flange by means of a housing cover closing the filter housing. The filter housing is perforated in the middle, and it has a cylindrical flow channel there, which passes through the filter element or the filter elements. The flow channel has a sealing surface as the contact surface for the filter element, and the filter element is fixed by the housing cover on both the flange and the sealing surface at the same time. To seal the filter element against the housing or to seal individual filter elements arranged in parallel to one another, sealing rings are provided. The sealing rings are compressed when placed on the housing cover, and they press the filter element against the flange and the sealing surface due to their elastic deformation.

To uniformly distribute the air to be purified over the filter surface, a free space in the form of a spacer section is provided between the filter element and the housing cover. With the free space an air distribution chamber is formed, provided between the filter element and the housing cover.

One disadvantage of the prior-art respirator filter is that its manufacture is complicated, because filter elements and sealing rings must be placed into the filter housing in a defined sequence, and a great number of individual parts are needed to assemble the filter.

German Patent No. DE-PS 655,223 discloses a respirator filter with a pot-shaped filter housing and with a filter element placed into the filter housing, in which the filter element is in contact with a flange folded outwards on the filter housing, and it is pressed against the flange with a housing cover. The housing cover is firmly connected to the filter housing by rolling its outer edge onto the flange.

The disadvantage of this prior-art respirator filter is that only the size of the flat surface of the flange is decisive for achieving good sealing between the filter housing and the filter element. Since such respirator filters can also be inserted into filter mounts, this predetermines defined assembly dimensions, so that the flange surface usually must be limited to the absolutely necessary dimension, which may lead to problems in terms of sealing in some cases.

British Patent No. GB-PS 438,556 discloses a respirator filter with a pot-shaped filter housing, in which the filter element is placed over the flanged edge of the filter housing and is rolled onto the edge together with the housing cover.

Even though the prior-art respirator filter has more favorable assembly dimensions than an outwardly projecting flange, the sealing of the filter element against the filter housing is not satisfactory.

West German Patent No. DE-PS 702,119 discloses a respirator filter, in which the filter element is accommodated in a holder on the housing cover of the filter housing, and the housing cover is connected to the filter housing in the manner of a double fold. Even though a good gas-tight connection of the housing cover to the filter housing is ensured in this prior-art respirator filter, and this connection can also easily be bent up again with special machines, a separate holder is necessary for fastening the filter element.

SUMMARY AND OBJECTS OF THE INVENTION

The basic object of the present invention is to optimize a respirator filter of the type described in terms of ease and simplicity of manufacture.

This object is attained in that with a housing cover located at a spaced location from and in parallel to the filter housing, a distance "a" between the sealing surface and the corresponding part of the housing cover, on the one hand, and a distance "b" between the flange and the outer edge of the housing cover, on the other hand, are dimensioned such that the distance "a" is smaller than the distance "b," so that when the housing cover is being placed onto the filter housing, it comes into contact first with the sealing surface, and then with the flange, while the housing cover warps.

The advantage of the present invention is essentially the fact that the filter element is sealed, in the area of the sealing surface of the flow channel passing through the filter housing by the elastic deformation of the housing cover. The cover comes into contact first with the sealing surface, and is then pressed against the flange. To achieve the pre-tension of the housing cover necessary for good sealing in the area of the sealing surface, the distances "a" and "b" are dimensioned such that the distance "b" is greater than the distance "a" by a few mm, preferably by 2 mm. The need for separate sealing rings for sealing the filter element against the filter housing is thus eliminated.

The filter element, designed as a folded ring filter, is advantageously fastened in a fold formed by pressing the outer edge of the housing cover onto the flange. Thus, the outer edge may be rolled, e.g., into the fold. An especially simple joining of the housing cover with the filter housing is possible due to this manner of connection.

The fold is advantageously designed as a double fold in such a manner that it decreases the spacer section "c" between the filter element and the housing cover, and it is folded over essentially in parallel to the wall of the filter housing. Improved sealing of the filter element within the flange is thus additionally achieved, because the outside of the filter element is pulled into the fold when the double fold is shaped, as a result of which the spacer section (c) is slightly reduced, and the overlapping section of the filter element between the flange and the housing cover is increased.

The sealing surface of the flow channel is preferably designed with a semicircular contour, and the housing cover has a correspondingly adapted body shape in the area of the sealing surface, as a result of which the sealing of the filter element against the filter housing and against the housing cover is improved based on the larger overlapping section resulting from the semicircular contour, and this overlapping section acts as an area of the sealing surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a sectional view of the respirator filter according to FIG. 1 with the housing cover placed on the filter housing and rolled in.

DETAILED DESCRIPTION OF THE PREFERRED EMBODIMENT

Figure 1:
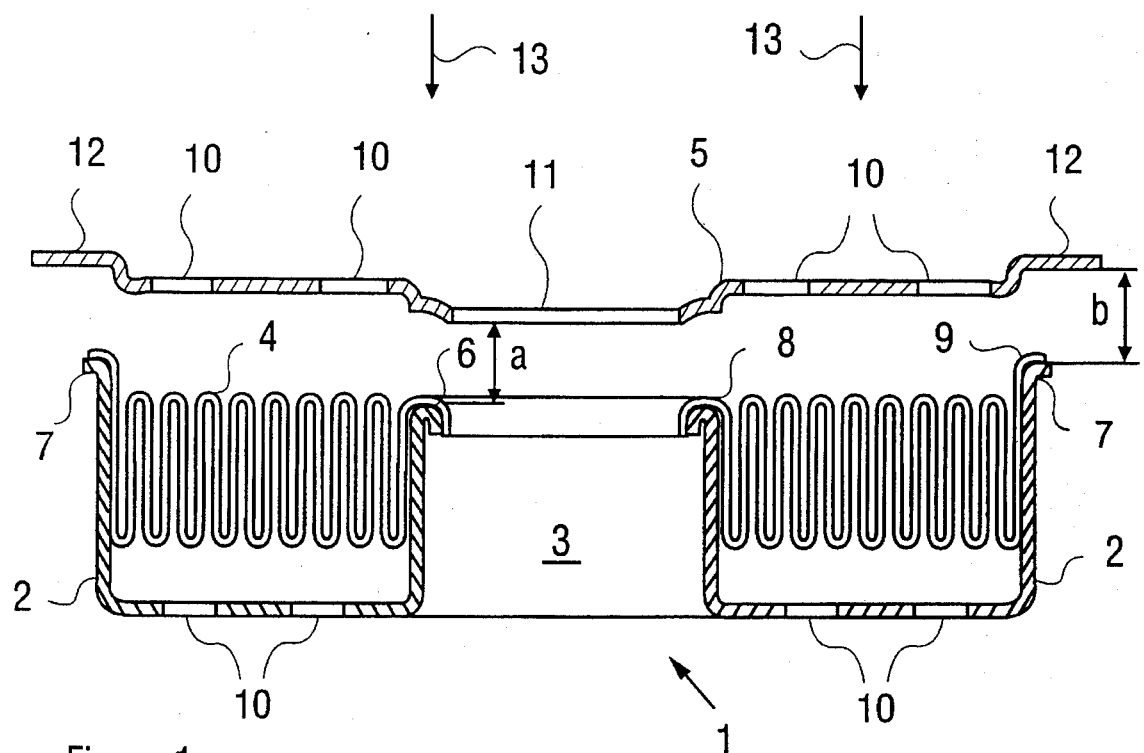
FIG. 1 is a sectional view of a respirator filter with the housing cover removed from the filter housing.

The respirator filter 1 shown in FIG. 1 is comprised of a pot-shaped filter housing 2 with a centrally arranged flow channel 3, which permits a flow of gas through the filter housing 2, with a sealing surface (6), a filter element 4 inserted into the filter housing 2, and with a housing cover 5. The outer edge of the filter housing 2 is folded to form an outwardly projecting flange 7.

The filter element 4, which is designed as a folded ring filter in this case, is perforated in the middle, and its inside 8 is in contact with the semicircular sealing surface 6, and its outside 9 is in contact with the flange 7 of the filter housing 2. The housing cover 5 has a design corresponding to the filter housing 2 in the area of the sealing surface 6 and of the flange 7, i.e., it is semicircular in the area of the sealing surface 6 and flat in the area of the flange 7. FIG. 1 shows the respirator filter 1 in the disassembled state with the housing cover 5 removed and with the distances "a" between the sealing surface 6 and the corresponding part of the housing cover 5 and "b" between the flange 7 and the outer edge of the housing cover 5.

Perforations 10 for the admission and outlet of gas are provided in the filter housing 2 and the housing cover 5. The housing cover 5 has an opening 11 in the area of the flow channel 3, and an outer edge 12 extending beyond the flange 7 of the filter housing 2 in the area of the flange 7. The distances "a" and "b" are dimensioned such that "a" is smaller than "b," so that when the housing cover 5 is being placed on the flange 7 or the sealing surface 6 of the filter housing 2 along the arrow 13, the housing cover 5 comes into contact first with the sealing surface 6 and then with the flange 7, while the housing cover 5 warps. The sealing of the filter element 4 in the area of the sealing surface 6 is thus achieved by the elastic warping of the housing cover 5. The housing cover is preferably made of a thin sheet metal. The difference between the distances "a" and "b" is preferably greater than or equal to 2 mm.

Figure 2:
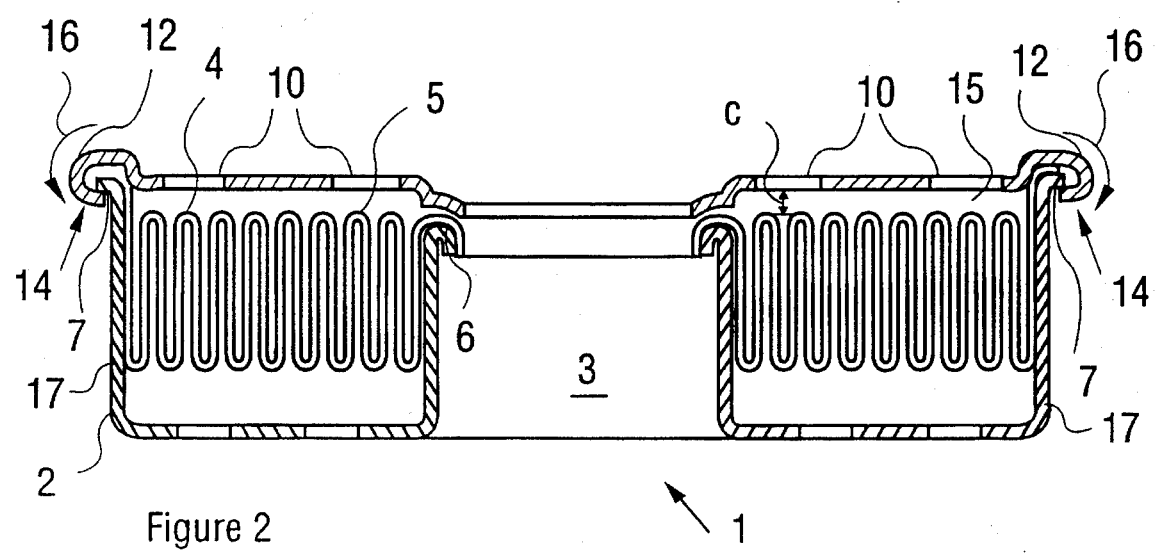

FIG. 2 shows the respirator filter 1 according to FIG. 1 with the housing cover 5, which is placed on the filter housing 2 and whose edge 12 is rolled around the flange 7 as a fold 14; identical components are designated by the same reference numerals as in FIG. 1. An air distribution chamber 15, which is formed essentially by the spacer section "c" between the filter element 4 and the inside of the housing cover 5, is located within the respirator filter 1. The air distribution chamber 15 is used to uniformly distribute the gas flowing in via the perforations 10 over the filter surface.

Figure 3:
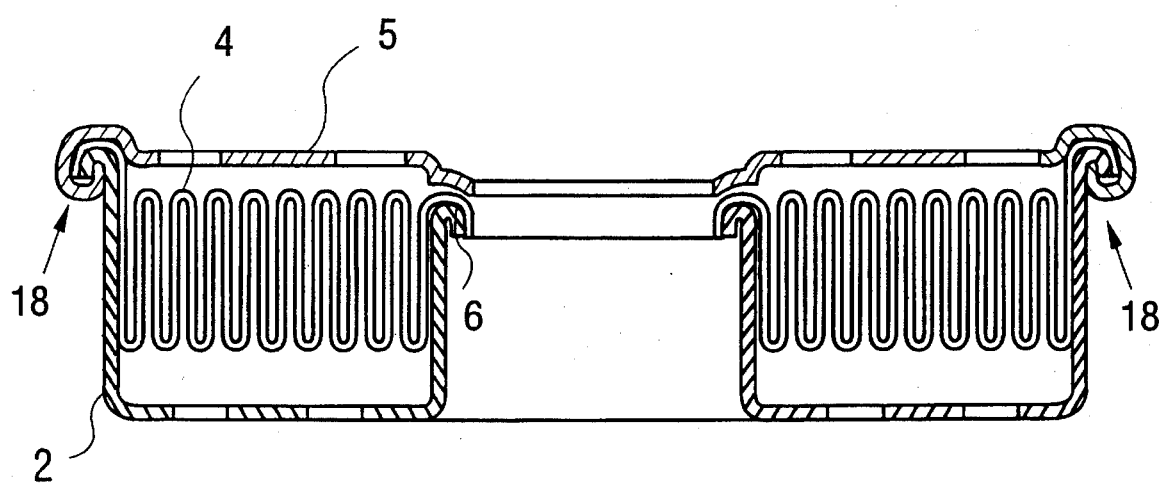
FIG. 3 is a sectional view of the respirator filter with the housing cover fastened in the manner of a double fold.

The sealing action of the filter element 4 against the filter housing 2 is further improved if the fold 14 is bent off along the bending arrow 16 approximately in parallel to the wall 17 of the filter housing 2, as a result of which a double fold illustrated in FIG. 3 is formed. The improved sealing action is achieved by the outside 9 (FIG. 1) of the filter element 4 being pulled into the double fold 18 during the shaping of the double fold 18 and thus slightly reducing the spacer section "c" (FIG. 2).

While a specific embodiment of the invention has been shown and described in detail to illustrate the application of the principles of the invention, it will be understood that the invention may be embodied otherwise without departing from such principles.

What is claimed is:

1. A respirator filter comprising:

a substantially pot-shaped filter housing including an outer wall with a flange at an outer edge thereof and an inner wall defining a flow channel passing through the filter housing, said inner wall having an outer edge defining a sealing surface;

a filter element disposed in said filter housing; and an elastic housing cover for closing the filter housing, said housing cover having a sealing surface engaging portion and a flange engaging portion, when said housing cover is located at a spaced location from said housing parallel to said sealing surface, a distance (a) is defined between said sealing surface and said sealing surface engaging part of said housing cover and a distance (b) is defined between said flange and said flange engaging part of said housing cover, said distance (a) being smaller than said distance (b), said housing cover being placed on to said filter housing with said sealing surface engaging part engaging said sealing surface and said flange engaging part engaging said flange, to warp said housing cover, said housing cover pressing said filter element against said flange and said sealing surface, said housing having a spacer section defining an air distribution space between said filter element and said housing cover.

2. A respirator filter according to claim 1, wherein said filter element is formed as a folded ring filter, said filter element being fastened in a fold formed by pressing an outer edge of said flange engaging part of said housing cover onto said flange.

3. A respirator filter according to claim 2, wherein said fold is formed as a double fold, substantially in parallel to said outer wall of said filter, said double fold being formed in a manner to reduce said spacer section between said filter element and said housing cover.

4. A respirator filter according to claim 1, wherein said sealing surface has a semi-circular contour and said housing cover sealing surface engaging part has a shape adapted to said semi-circular contour in an area of said sealing surface.

5. A respirator filter according to claim 2, wherein said sealing surface has a semi-circular contour and said housing cover sealing surface engaging part has a shape adapted to said semi-circular contour in an area of said sealing surface.

6. A respirator filter according to claim 3, wherein said sealing surface has a semi-circular contour and said housing cover sealing surface engaging part has a shape adapted to said semi-circular contour in an area of said sealing surface.

* * * * *